United States Patent
Hahn

(10) Patent No.: US 11,192,164 B2
(45) Date of Patent: *Dec. 7, 2021

(54) CENTERING BLANKS

(71) Applicant: AUTOTECH ENGINEERING S.L., Amorebieta-Etxano (ES)

(72) Inventor: Thomas Hahn, Ludwigsfelde (DE)

(73) Assignee: AUTOTECH ENGINEERING S.L., Amorebieta-Etxano (ES)

( * ) Notice: Subject to any disclaimer, the term of this patent is extended or adjusted under 35 U.S.C. 154(b) by 0 days.

This patent is subject to a terminal disclaimer.

(21) Appl. No.: 17/023,069

(22) Filed: Sep. 16, 2020

(65) Prior Publication Data

US 2020/0406328 A1 Dec. 31, 2020

Related U.S. Application Data

(63) Continuation of application No. 15/280,887, filed on Sep. 29, 2016, now Pat. No. 10,799,929.

(30) Foreign Application Priority Data

Oct. 13, 2015 (EP) .................................... 15382493

(51) Int. Cl.
*B21D 43/02* (2006.01)
*B21D 22/02* (2006.01)
(Continued)

(52) U.S. Cl.
CPC ......... *B21D 22/022* (2013.01); *B21D 43/003* (2013.01); *B21D 43/023* (2013.01);
(Continued)

(58) Field of Classification Search
CPC .... B21D 43/003; B21D 43/023; B21D 43/26; B65G 21/2072
See application file for complete search history.

(56) References Cited

U.S. PATENT DOCUMENTS 3,344,633 A 10/1967 Wilson
4,067,458 A 1/1978 Schneider et al.
(Continued)

FOREIGN PATENT DOCUMENTS

CN 103111536 A 5/2013
CN 203018628 U 6/2013
(Continued)

OTHER PUBLICATIONS

Extended European Search Report dated Mar. 30, 2016 for EP Application No. 15382493.3 (7 pages).
(Continued)

*Primary Examiner* — Mark C Hageman
(74) *Attorney, Agent, or Firm* — Squire Patton Boggs (US) LLP

(57) ABSTRACT

A centering system comprising a conveyor for receiving a plurality of blanks outputted from a furnace and displacing the blanks along a first horizontal axis and shifting units for each individual blank including two or more adjustable lifting bars, the shifting units configured to move along a second horizontal axis, and the adjustable lifting bars being configured to lift the blanks along a vertical axis, wherein each of the shifting units is independently movable along the second axis, and a plurality of centering pins for centering the blanks, such that the blanks can be centered by moving the individual blanks along the second axis against the centering pins. Also disclosed are conveyor systems and methods for centering and conveying blanks.

20 Claims, 7 Drawing Sheets

(51) Int. Cl.
*B21D 43/26* (2006.01)
*B21D 43/00* (2006.01)
*B65G 13/00* (2006.01)
*B65G 21/20* (2006.01)
*B65G 37/00* (2006.01)
*B65G 47/244* (2006.01)

(52) U.S. Cl.
CPC ............ *B21D 43/26* (2013.01); *B65G 13/00* (2013.01); *B65G 21/2072* (2013.01); *B65G 37/00* (2013.01); *B65G 47/244* (2013.01)

(56) References Cited

U.S. PATENT DOCUMENTS

| | | | |
|---|---|---|---|
| 6,185,979 | B1 | 2/2001 | Schollhammer |
| 8,382,084 | B2 | 2/2013 | Gerber |
| 9,010,524 | B2 | 4/2015 | Dorr |
| 2014/0144198 | A1 | 5/2014 | Potocki et al. |

FOREIGN PATENT DOCUMENTS

| | | |
|---|---|---|
| CN | 103240350 A | 8/2013 |
| CN | 103687795 A | 3/2014 |
| CN | 203470711 U | 3/2014 |
| DE | 2534819 | 2/1977 |
| DE | 3311116 A1 | 9/1984 |
| JP | S642741 A | 1/1989 |

OTHER PUBLICATIONS

Notice of Opposition dated Dec. 14, 2018 issued for European Patent No. 3156146, with English translation of relevant pages, 25 pages.

YouTube video uploaded Sep. 25, 2015, listed as Reference D5a in the Notice of Opposition, 1 page.

Office Action issued for Chinese Patent Application No. 2016108810275, English translation—11 pages.

Machine translation of CN103111536 from espacenet (Year:2013).

CENTERING BLANKS

CROSS-REFERENCE

This application is a Continuation Application of U.S. application Ser. No. 15/280,887 filed on Sep. 29, 2016, which claims the benefit of and priority to European Patent Application 15382493.3, filed Oct. 13, 2015, the entire contents of which are hereby incorporated by reference.

The present disclosure relates to a centering system for centering blanks outputted from a furnace and to conveying systems in hot forming production lines. The present disclosure further relates to methods for centering and conveying blanks in a hot forming production line.

BACKGROUND

Several manufacturing industries produce and process metal blanks to obtain end products. In such processes, the blanks may be conveyed along a production line. Some of these production lines comprise a hot forming process, e.g. a hot stamping process.

Hot stamping is a common process in e.g. the automotive industry which allows manufacturing hot formed structural components with specific properties which may include features such as a certain strength, thickness and lightness. In a hot stamping line system, a furnace system that heats and softens the blank to be hot formed is provided upstream from a press system. The press system then deforms the blank substantially to the shape of the end product. After the press step, post operations such as calibrating, folding flanges, and drilling holes may be performed. Typically in the automotive industry, high strength steel or ultra high strength steel blanks are used. The steel blanks obtain a suitable microstructure with high tensile strength by cooling the blanks in the press or after the press. The increase in a component's strength obtained by these processes may allow for a thinner gauge material to be used, which results in weight savings over conventionally cold stamped mild steel components for automotive applications.

In order to increase productivity, the press systems may comprise a plurality of dies configured to stamp several blanks simultaneously. A single press system comprising a plurality of pairs of upper and lower dies may be provided, in which each die pair (upper and lower die) is configured for stamping a blank. Or a plurality of press systems may be provided, wherein each of the press systems comprises a single upper and lower die. Combinations hereof are also possible.

In this context, it is possible to consecutively and stably load blanks onto the workstations of the press machine by a blank loading system, and sequentially perform press work on the loaded blanks by one stroke, thereby improving productivity, and remarkably reducing the cost of production. Alternatively, several parallel press systems can be used.

A conveyor system in such a production line is configured to convey a cold blank to a furnace and through a furnace. A furnace and a conveyor system are configured such that the blanks are heated to a desired temperature and for a desired time period (e.g. 3-5 minutes) before exiting the furnace. The transportation of the components through the furnace takes place on e.g. roller conveyors. In order to be able to form or press several blanks at the same time, several blanks are conveyed in parallel to each other and exit the furnace at the same time.

As the blanks exit the furnace, the blanks need to be correctly positioned in order to transfer the blanks correctly to the hot forming dies. If multiple blanks exit the furnace at the same time, the blanks need to be correctly positioned with respect to each other so that the blanks may be transferred to the hot forming dies correctly. The transfer from the exit region of the furnace to the hot forming dies may be done using industrial robots for each individual blank, or may be done using a transportation fork that lifts all blanks at the same time and deposits the blanks in the dies.

However, known methods of transferring heated blanks outputted from a furnace to a press tool comprising the above mentioned efficiency improvements and processing capacity are limited by the dimensions of the run-out section of the furnace versus the dimensions of the pressing tools.

The dies of the press system(s) require a certain positioning and distance in between blanks in order for them to be simultaneously hot stamped. Such a restriction indirectly sets a limitation on the number of blanks that can be fed by the furnace, as well as on which position along the conveyor they have to be fed.

The distances required between blanks in the dies mean that the same distances have to be provided along the conveyor and in the furnace. Thus, the width of the furnace may need to be increased in some cases in order to be able to press e.g. four or six blanks at the same time.

Additionally, the conveyors may become dirty along the parts of the conveyor(s) on which the blanks are placed. In order to avoid the blanks becoming dirty, it would be desirable to place the blanks on different portions of the conveyor(s).

The present disclosure seeks to provide improvements in centering systems configured to center blanks outputted from a furnace in a hot stamping line system and methods.

SUMMARY

In a first aspect, the present disclosure provides a centering system for centering blanks outputted from a furnace in a hot stamping line. The centering system comprises a conveyor for receiving a plurality of blanks outputted from a furnace and displacing the blanks at least along a first horizontal axis. The centering system further comprises shifting units for each individual blank comprising two or more adjustable lifting bars, the shifting units configured to move along a second horizontal axis substantially perpendicular to the first direction, and the adjustable lifting bars being configured to lift the blanks along a vertical axis substantially perpendicular to both the first and second axes. Herein each of the shifting units is independently movable along the second axis, and a plurality of centering pins for centering the blanks is provided, such that the blanks can be centered by moving the individual blanks along the second axis against the centering pins.

At the exit of the furnace, each of the blanks may be positioned on an individual shifting unit. The shifting units can lift the blanks up from the conveyor(s). Each of the shifting unit can be driven individually along a direction perpendicular to the conveying direction at the exit of the furnace. Centering can take place by moving each of the blanks individually against centering pins. By individually moving the blanks, the distance between individual blanks can be increased and adapted, which result comes from collaboration between shifting units and centering pins. The distance between blanks can thus be increased in between the furnace and the press system(s). The same system also enables repositioning the blanks to the correct position if they are conveyed on different positions of the conveyor(s) if they have become dirty.

Hereinafter, the direction of the conveying path is called the first direction or x-axis. The direction in the conveying plane which is perpendicular to the first direction is called the second direction or y-axis. The vertical direction which is perpendicular to the conveying plane is called the third direction or z-axis.

It is noted however that the conveying path at the exit of the furnace may be inclined in some implementations. The first direction (x-axis) is then to be understood as the horizontal component of the conveying direction. The second direction or y-axis is horizontal as well and perpendicular to the x-axis. The third direction (z-axis) is perpendicular to both the x-axis and y-axis and is thus substantially vertical.

In a further aspect, a method for centering blanks in a hot forming line is provided using such a centering system described. The method comprises receiving a plurality of blanks from a furnace and displacing the plurality of blanks at least along a first horizontal axis, lifting the blanks from a pre-centering plane defined by the first horizontal axis and a second horizontal axis perpendicular to the first horizontal axis, along a third axis perpendicular to the plane, and centering the blanks by individually moving the blanks along the second axis against centering pins.

In some examples, one or more of the centering pins are moveable along the y axis. This provides versatility to adapt the centering system to blanks of different shapes and dimensions without necessarily having to adapt the shifting units or shifting units movements. Additionally or alternatively, one or more of the centering pins are moveable along the vertical z-axis. The centering pins may be driven vertically in order to retract and provide an uninhibited passing of the blanks from the furnace to a (pre)-centering plane. Once the blanks have reached this plane, the centering planes may be driven so as to provide a blocking element against which the blanks can be driven.

In some examples, the method may comprise pre-centering the blanks in the pre-centering plane prior to lifting the blanks. As the blanks are conveyed through the furnace they may be moved slightly and it is possible that the blanks do not exit the furnace in a straight orientation. The pre-centering may be performed by centering pins moving in the second direction. In some examples, dedicated "pre-centering pins" may be provided. Pre-centering pins as used herein are to be understood as pins exclusively used for pre-centering. Pins exclusively used or also used for centering are herein regarded as centering pins. In other examples, pre-centering may be carried out by the same pins that ensure centering.

In some examples, the centering system may comprise four shifting units, i.e. for four blanks. In some of these examples, pairs of the shifting units are configured for moving from a neutral position to a centering position in opposite directions. The distance between the pairs of blanks may thus be increased. The distance between individual blanks of the pairs may be adjusted by the centering pins.

In a further aspect, a conveyor system is provided including a centering system and a transfer robot for each individual blank to transfer the blanks individually to a hot forming press.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
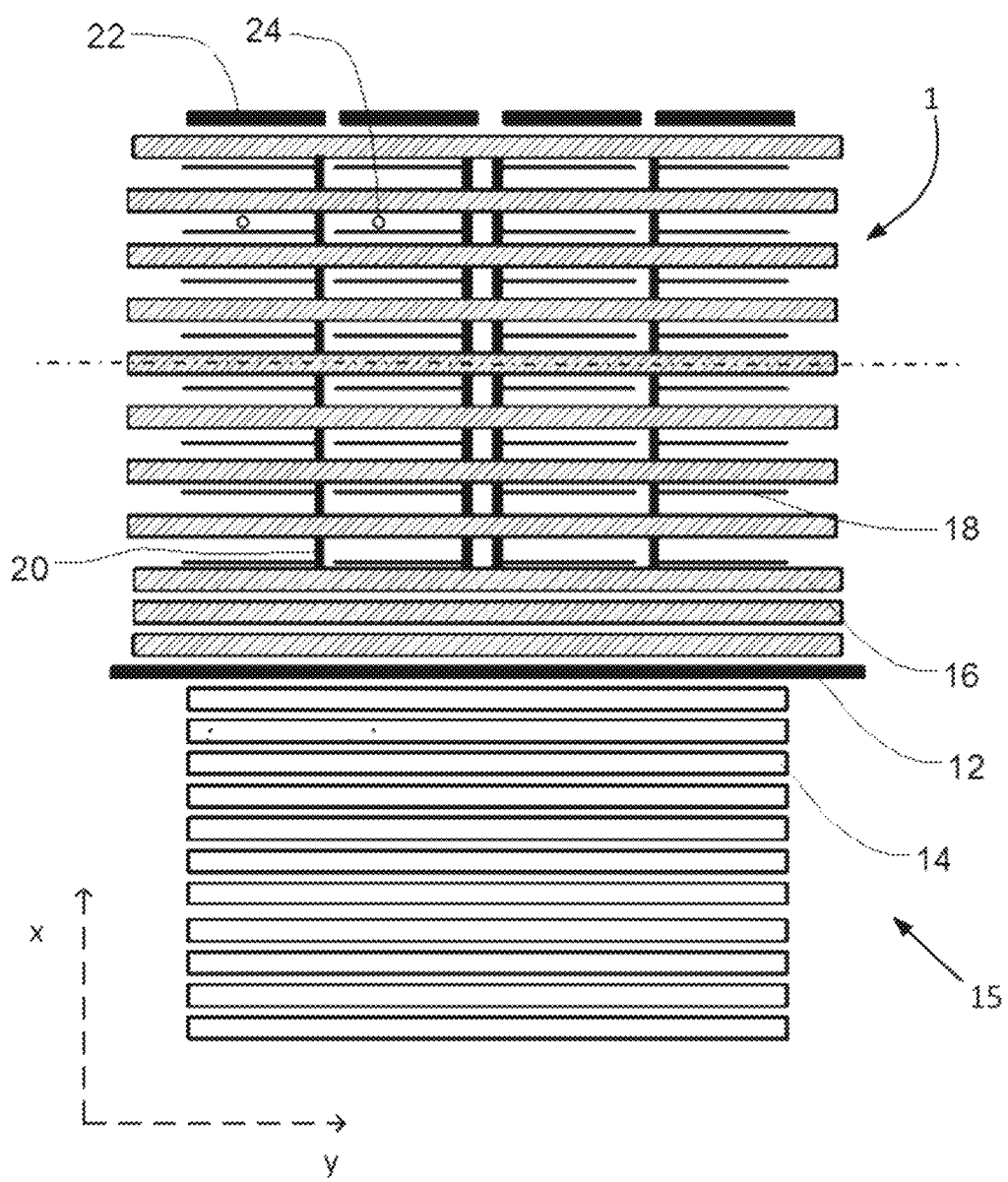
FIG. 1 schematically shows in a top view an example of a centering system for centering blanks outputted from a furnace in a hot stamping line.

FIG. 1 schematically represents a centering system 1 for centering blanks outputted from a furnace 15 in a hot stamping line according to an example. Blanks may be transported by a conveyor system. In this example, a roller conveyor comprising a large number of conveyor rollers is shown. The conveyor rollers are distanced from each other in a conveying direction (x-axis in FIG. 1). The rollers may be driven by motors that can control the speed of the conveyor rollers.

Conveyor rollers 14 convey the blanks through furnace 15. In the furnace, the blanks are heated to a desired temperature. For example, in case boron steel blanks are used, a desired temperature may be around 900° C. At the exit of the furnace, a door 12 is provided. The door is configured or controlled to open when the blanks arrive and to close again when the blanks have left the furnace. This way the heat produced inside the furnace can be kept inside the furnace.

As the blanks leave the furnace 15, they are conveyed through further rollers 16 towards stoppers 22. In the specific example shown, the hot forming line is designed for four blanks being hot formed simultaneously. Thus four blanks may be conveyed side by side through the furnace and onto the centering table. Each of the stoppers 22 may be individually controllable and move in the conveying direction (along the x-axis). The position of the stoppers determines the end position of the blanks before centering takes place. The conveyor rollers 16 may be intermittently driven. As the blanks exit the furnace, these conveyor rollers 16 are rotated to convey the blanks until they reach the stoppers. Then the rollers may be stopped.

Figure 2:
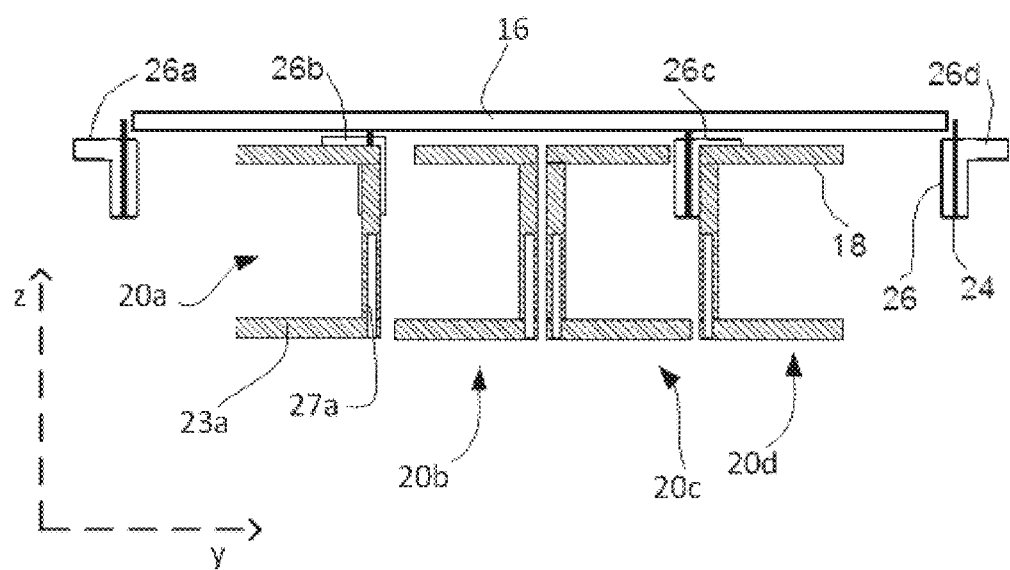
FIG. 2 schematically illustrates a cross-sectional side view of an example of a centering system for centering blanks.

In this particular example, the centering table 1 may be composed by four independent shifting units 20 having eight lifting bars 18. Each of the lifting bars is arranged in between two of the conveyor rollers 16. The lifting bars can thus move upwards (in the illustration of FIG. 1, upward out of the paper; z-axis as indicated in FIG. 2) in between the conveyor rollers to lift the blanks out of the "pre-centering plane".

The system may also comprise a plurality of centering pins 24 and pre-centering pins. A selection of the centering pins may be non-actuated pins and others may be actuated pins, which means respectively that they are either retracted with respect to the movement path of the blanks, and therefore they are not interacting with the blanks, or that they are non-retracted with respect to the movement path of the blanks, and therefore they are able to interact with the edges of the blanks (i.e. stop and/or center the blanks). The selection of pins that are actuated and non-actuated may be adapted in accordance with the number of blanks, type of blanks and dimensions of blanks.

A selection of the pins may be passive, i.e. they always maintain the same position, and the same height. A selection or all of the pins may be controlled to adapt their height. For example, the pins may be underneath the plane of the conveying plane (i.e. the plane coinciding with the top of the conveyor rollers) as the blanks are conveyed towards the stoppers. Then, subsequently for centering the pins may be raised to reach a height at least above the conveying plane. Similarly, a selection of the pins may be controlled to adapt their position in a horizontal direction perpendicular to the conveying direction, i.e. along the y-axis indicated in FIG. 1.

In some examples, pre-centering may occur after the blanks have reached the stoppers. The position of the blanks along the x-axis is thereby determined. Then, in order to bring the blanks in the correct orientation, a number of (pre)-centering pins may be driven along the y-axis and slightly reposition of the blanks.

After the optional pre-centering step, the lifting bars 18 of each shifting unit 20 can move along the z-axis and raise the blanks. Then, the shifting units may be displaced along the y-axis against centering pins. The centering pins thereby determine the end positions of the blanks.

It may be seen that the width of the centering table 1 is larger than the width of the furnace 15. In an example, the furnace may have a width of approximately 2.3 meters, whereas the width of the centering table 1 may be approximately 3 meters. The centering table according to this example makes it possible to increase the distance between the blanks in order for their further processing. The width of the furnace does not need to be increased accordingly, which can reduce the cost of the furnace as well as the energy consumption.

FIG. 2 schematically illustrates a cross-sectional side view of a centering system for centering blanks according to the example of FIG. 1. In FIG. 2, the shifting units 20 and the lifting bars 18 are in a retracted position, below the conveying plane defined by the top surface of the conveyor rollers 16. Moreover, pins 24 are as well retracted and thus, below the rollers 16 level.

In FIG. 2, four separate shifting units 20a, 20b, 20c and 20d are shown. Each of these shifting units may comprise base 23 and an actuator 27 to adapt the height of the lifting bars 18. The base 23a and actuator 27a are indicated for shifting unit 20a. The actuator shown may be e.g. a hydraulic or pneumatic or actuator. In some examples, each of the lifting bars may have an individual actuator.

Also shown in FIG. 2 are a plurality of pin bases 26a, 26b, 26c and 26d in which pins 24 are sunk (in the situation shown in FIG. 2). The pins may be driven out of their bases using suitable actuators (e.g. hydraulic, pneumatic or electric involving gears).

The pin bases may be elongated guides along which the pins can slide. In the view of FIG. 1, they may extend sideways and may be arranged in between the conveyor rollers. The bases and the lifting bars may be relatively thin so that they fit next to each other in between the conveyor rollers 16.

FIGS. 3a-3e schematically illustrate in top view a sequence of situations occurring during an example of a method for centering blanks. The centering system depicted in the sequence of FIGS. 3a-3e is generally very similar to the system of FIGS. 1 and 2. The same elements are indicated using the same reference signs.

In this case, active centering pins are indicated with reference signs 24. Passive centering pins (at least in the shown sequence) are indicated with reference signs 25. As mentioned earlier, in a sequence involving different blanks of different shape or different dimensions, some of the pins which are herein shown to be active may then be passive and vice versa.

Figure 3A:
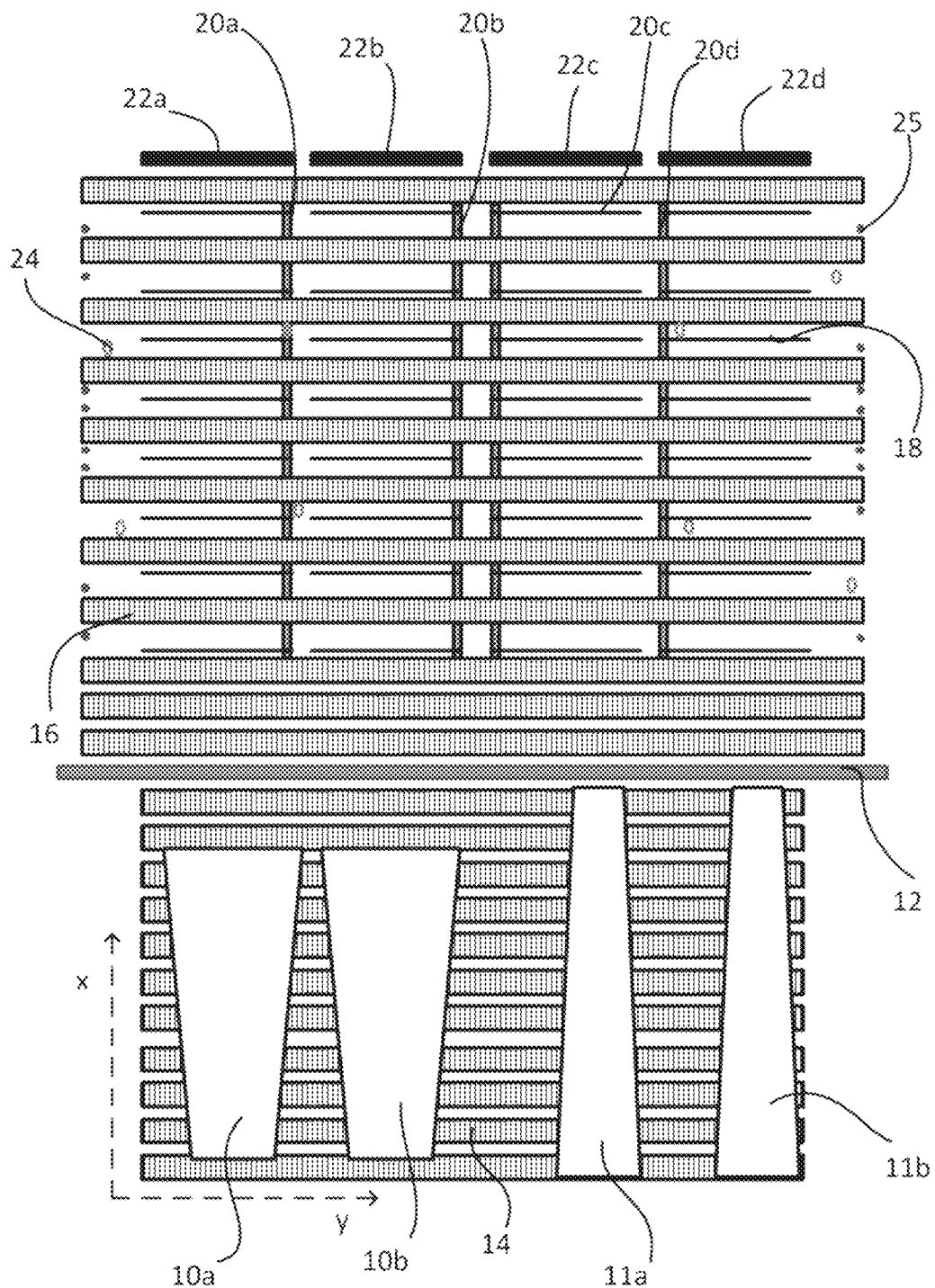
FIGS. 3a-3e schematically illustrate in a top view a sequence of situations occurring during the performance of an example of a method for centering blanks.

In FIG. 3a, four blanks are shown. A pair of blanks 10a and 10b is of a first type, whereas another pair of blanks 11a and 11b is of a different type. The blanks are shown to be in the furnace, whereas the door 12 of the furnace is closed. The conveyor rollers 14 are driven to convey the blank towards the exit and towards the centering table.

Figure 3B:
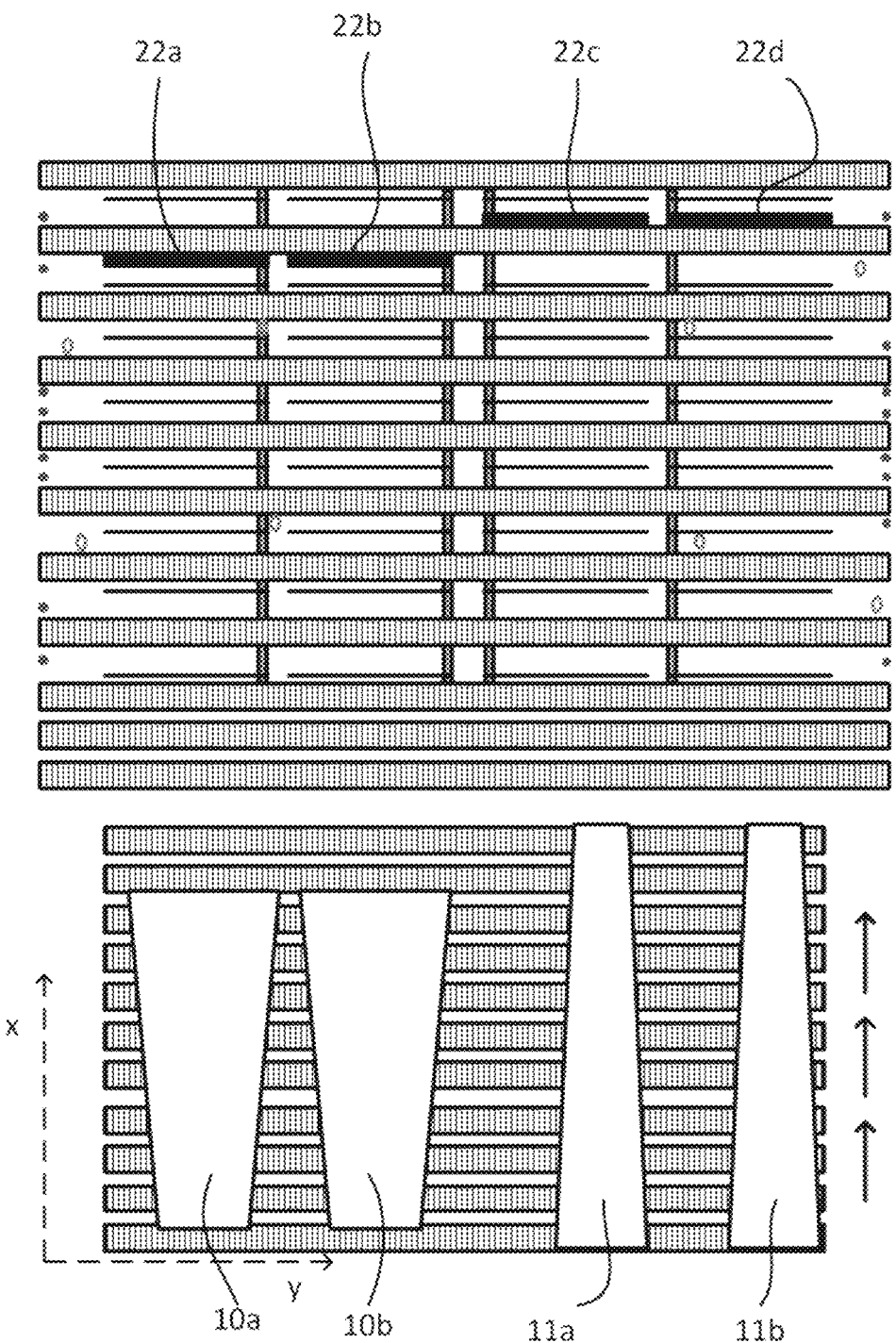

In FIG. 3b, the furnace door 12 has been opened (and is therefore not shown in this figure) and the stoppers 22a-22d have been moved to their stopping position. Stoppers 22a and 22b are in a stopping position to determine the end position in the x-direction of blanks 10a and 10b. Since blanks 11a and 11b have a different size, the position of stoppers 22c and 22d in the x-direction may be different in accordance with what is shown in FIG. 2b.

Figure 3C:
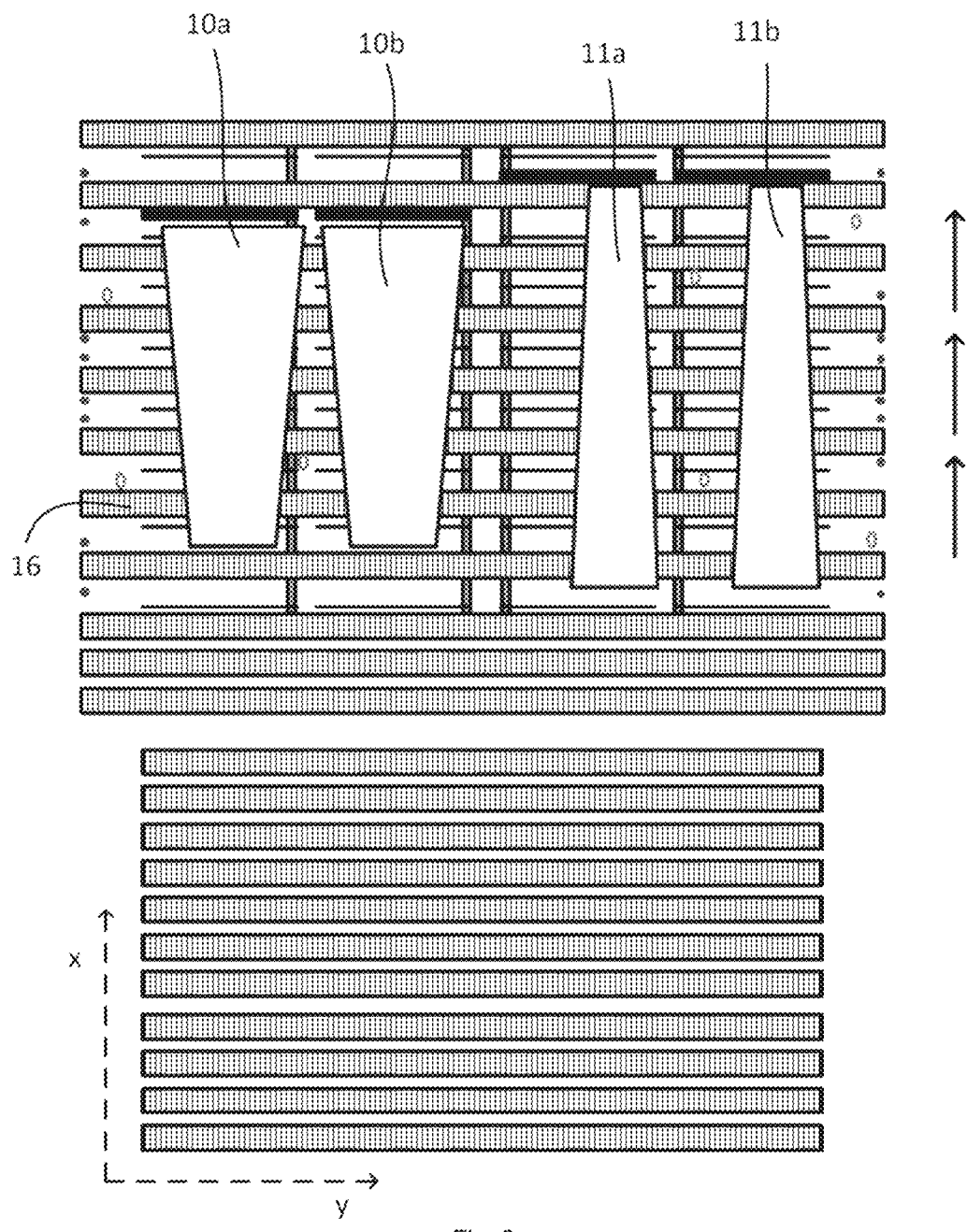

As the blanks exit the furnace, conveyor rollers 16 are driven to forward the blanks in the x-direction (FIG. 3c). When the blanks touch their respective stoppers, the conveyor rollers may be inactivated, so that when the stoppers 22a-22d return to their original position, the blanks do not move.

At this stage, a pre-centering step may take place (not illustrated). A number of pre-centering pins may be moved along the y-direction to correctly orient the blanks.

Figure 3D:
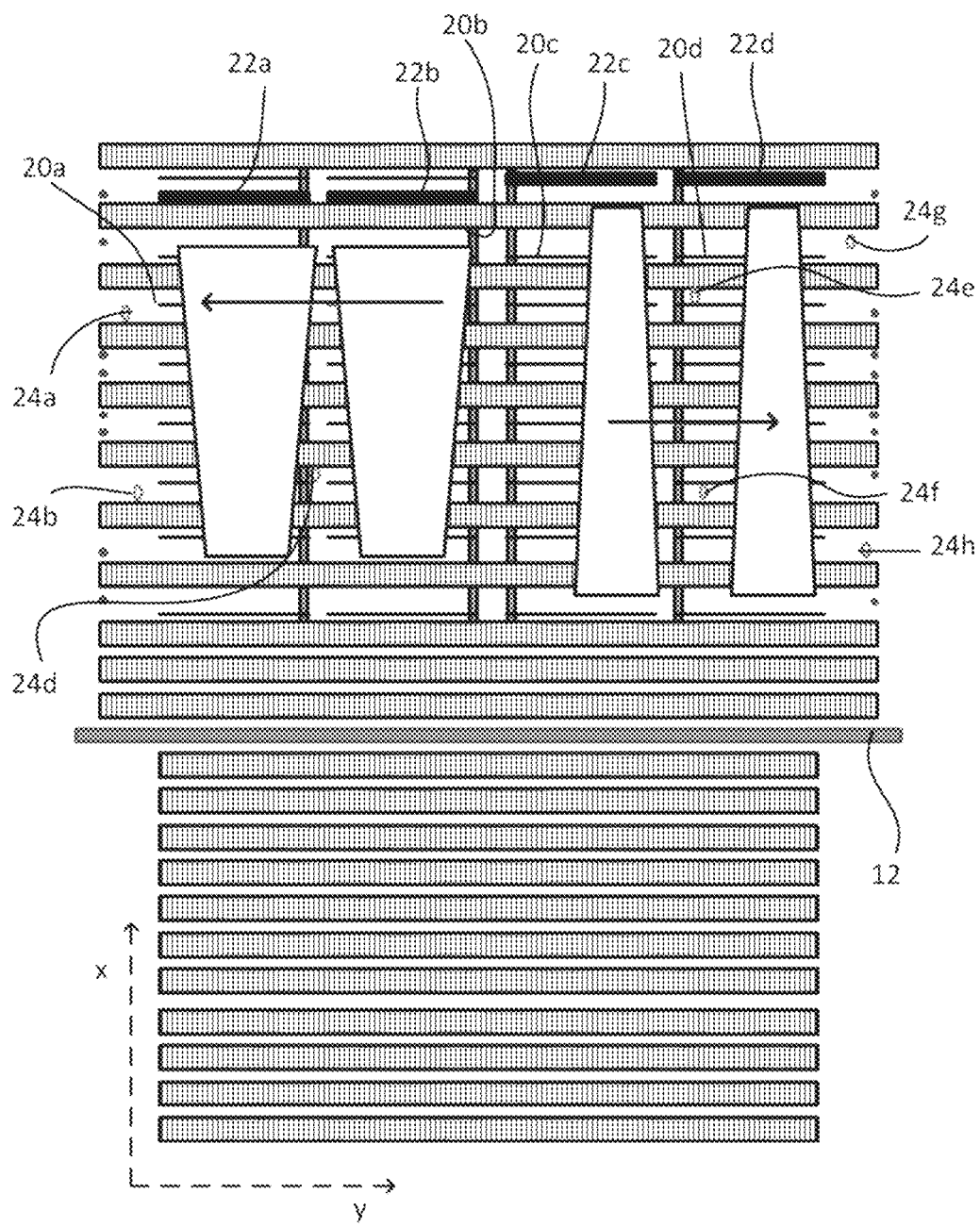

In FIG. 3d, the furnace door 12 is shown to be closed again and the stoppers 22a-22d have moved partly towards their original position. The blanks may then be lifted out of the conveying plane using the lifting bars 18 that are raised along the z-axis. Substantially at the same time, centering pins 24 are raised in the same direction. Some of the centering pins may have already been in a raised position. For example, centering pins 24a, 24b, 24g and 24h are relatively far removed from a normal conveying path of the blanks and there would be no need to withdraw them underneath the conveying plane.

On the contrary, centering pins 24d, 24e and 24f (and also centering pin 24c, only shown in FIG. 3e) may interfere with the movement of the blanks. These centering pins may thus be raised to their position for centering after the blanks have reached their respective stoppers.

Then the shifting units 20a and 20b with their corresponding lifting bars may be moved towards the left (in a "negative" direction along the y-axis), whereas the shifting units 20c and 20d may be moved towards the right (in a "positive" direction along the y-axis). In the case of centering pin 24c, this pin may be raised to its position used for centering only after the shifting units have started moving.

Figure 3E:
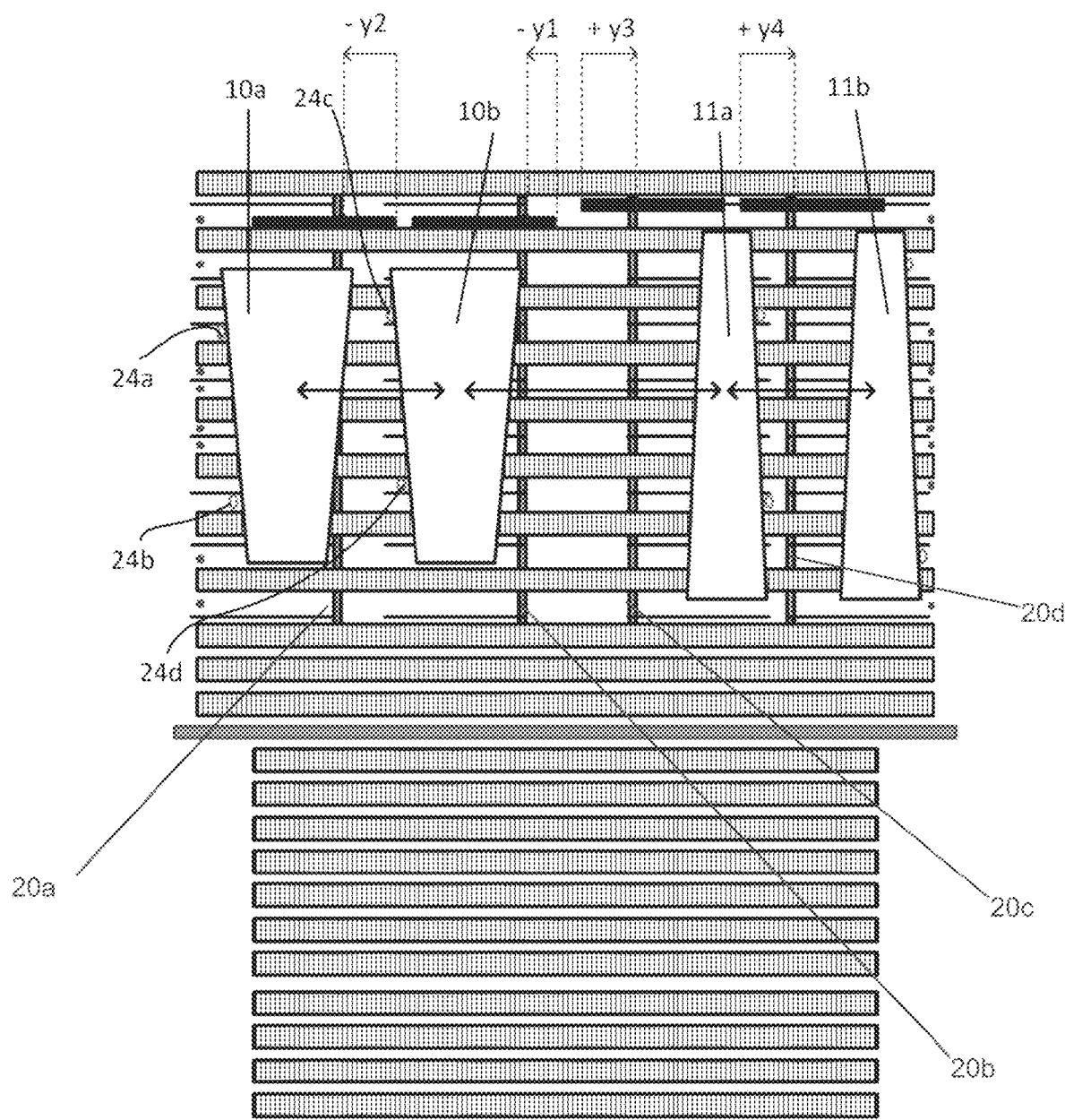

In the situation of FIG. 3e, the blanks touch the respective centering pins. When blanks touch centering pins, they are still in place even if the shifting unit is moved a little bit further. Thus the centering pin determines the position along the y-axis. Blank 10a is in contact with centering pins 24a and 24b. Blank 10b is in contact with centering pins 24c and 24d. Blank 11a is in contact with centering pins 24e and 24f. Blank 11b is in contact with centering pins 24g and 24h.

The shifting units 20a and 20b, as compared to previous figures have been moved along the y-axis in a negative direction. The shifting units 20c and 20d have moved along the y-axis in a position direction.

As illustrated in FIG. 3e, the outer shifting units 20a and 20d may have moved more than the inner shifting units 20b and 20c. The shifting units will thus not interfere with each other. Distance y2 is larger than distance y1. Similarly, distance y4 may be larger than distance y3, or at least of substantially the same magnitude.

By moving the shifting units in opposite directions, the distance between the pairs of blanks has been increased. Similarly, by the movements of the shifting units and the positions of the centering pins, the distance between blanks 10a and 10b and the distance between blanks 11a and 11b may be increased. The outer positions of the blanks may thus be beyond the width of the furnace. The furnace may thus be narrower, whereas at the same time the blanks may have sufficient spacing in order to be able to be transferred to the hot press(es) correctly.

Similarly, if portions of the conveyors have become dirty, the blanks may be positioned slightly differently on the conveyors so as to avoid the blanks becoming dirty. The centering table as proposed herein ensures that each of the blanks may still be positioned in the same end position even if they exit the furnace in slightly different positions along the y-axis.

A transfer robot (not shown), for example a suitable industrial robot, may pick up a blank from the shifting unit and place it on the hot press (not shown). The transfer robot to this end may comprise a plurality of gripping units to grab and pick up the blanks.

Gripping unit as used herein is to be understood as covering e.g. suction cups, clamps or similar.

In some examples, a single transfer robot may comprise several groups of gripping units, each group configured for picking up a blank, i.e. a single transfer robot can pick up more than one blanks at the same time.

In other examples, a plurality of transfer robots is provided, wherein each of the transfer robots is configured to pick up a single blank.

The expression "industrial robot" herein e.g. covers an automatically controlled, reprogrammable, and optionally multipurpose, manipulator programmable in three or more axes, which may be either fixed in place or mobile for use in industrial automation applications, as defined by the International Organization for Standardization in ISO 8373.

Even though the transfer robots may be (re) programmable, in accordance with their programming they will be able to pick up blanks only if they are positioned and centered correctly and consistently. This is what the centering table according to the examples and according to the methods disclosed herein ensures.

Although only a number of examples have been disclosed herein, other alternatives, modifications, uses and/or equivalents thereof are possible. In particular, the examples shown herein are adapted for pressing and conveying four blanks at the same time. In other examples, e.g. two or three or six blanks may be pressed at the same time and conveyed side-by-side. In these examples, each of the blanks may have an individual shifting unit and optionally an individual transfer robot for transferring the blanks from the centering table towards the hot press(es).

Furthermore, all possible combinations of the described examples are also covered. Thus, the scope of the present disclosure should not be limited by particular examples, but should be determined only by a fair reading of the claims that follow.

The invention claimed is:

1. A method for centering blanks in a hot forming line, the method comprising:
   receiving a first and a second blank simultaneously from a furnace and displacing the first and second blanks at least along a first horizontal axis with a conveyor;
   lifting the first and second blanks vertically from a pre-centering plane defined by the first horizontal axis and a second horizontal axis perpendicular to the first horizontal axis,
   wherein the lifting comprises lifting the first blank with a first shifting unit and lifting the second blank with a second shifting unit;
   centering the blanks by moving the first blank with the first shifting unit along the second axis against centering pins, and moving the second blank with the second shifting unit against centering pins.

2. The method according to claim 1, further comprising pre-centering the blanks in the pre-centering plane prior to lifting the blanks.

3. The method according to claim 1, wherein centering the blanks comprises moving the first blank in a first direction along the second axis, and moving the second blank in a second direction along the second axis, wherein the second direction is opposite to the first direction.

4. The method according to claim 1, wherein centering the blanks comprises moving the first blank and the second blank in the same direction along the second axis.

5. The method according to claim 4, wherein centering the blanks comprises separating the first and the second blank.

6. The method according to claim 1, wherein centering the blanks comprises moving one or more of the centering pins to a centering position prior to moving the first and second blanks against the centering pins.

7. The method according to claim 6, wherein some of the centering pins have a different height than some others of the centering pins.

8. The method of claim 1, wherein the first and second shifting units are independently movable along the second axis.

9. The method of claim 1, wherein each of the first and second shifting units comprises two or more adjustable lifting bars.

10. The method according to claim 9, wherein the conveyor is a rolling conveyor having a plurality of conveyor rollers separated along the first axis, wherein the lifting bars of the shifting units are arranged in between the conveyor rollers.

11. The method of claim 1, wherein the conveyor displaces the first and second blanks along the first horizontal axis against one or more stoppers.

12. The method of claim 1, wherein one or more of the centering pins are moveable vertically.

13. The method of claim 1, further comprising transferring the first and second blanks to a hot forming press using a first and second transfer robot.

14. A method comprising:
   receiving a first and a second blank simultaneously from a furnace and displacing the first and second blanks at least along a first horizontal axis with a conveyor;
   lifting the first and second blanks vertically from a pre-centering plane defined by the first horizontal axis and a second horizontal axis perpendicular to the first horizontal axis;
   subsequently individually moving the first and second blanks along the second horizontal axis against centering pins while the first and second blanks remain lifted above the pre-centering plane; and
   transferring the first and second blanks to a hot forming press.

15. The method of claim 14, wherein individually moving the first and second blanks comprises moving the first blank in a first direction along the second axis, and moving the second blank in a second direction along the second axis, wherein the second direction is opposite to the first direction.

16. The method according to claim 14, wherein the conveyor is a rolling conveyor having a plurality of conveyor rollers separated along the first horizontal axis.

17. The method according to claim 16, wherein the lifting the first and second blanks comprises lifting the first and second blanks with shifting units comprising two or more lifting bars, wherein the lifting bars are vertically moveable, and wherein the lifting bars are arranged between the conveyor rollers.

18. The method according to claim 14, wherein the first and the second blanks are received simultaneously from the furnace with a separation along the second horizontal axis between the first and second blanks, and wherein individually moving the first and second blanks along the second horizontal axis comprises increasing the separation between the first and second blanks.

19. The method according to claim 14, further comprising pre-centering the first and second blanks in the pre-centering plane prior to lifting the first and second blanks.

20. The method according to claim 19, further comprising vertically moving one or more of the centering pins prior to individually moving the first and second blanks along the second horizontal axis against the centering pins.

* * * * *